Patented Nov. 24, 1953

2,660,575

UNITED STATES PATENT OFFICE 2,660,575

POLYMERIZATION PROCESS FOR POLY-URETHANES UTILIZING WATER, A WATER MISCIBLE SOLVENT, AND A WATER IMMISCIBLE SOLVENT

Wilford Donald Jones and Samuel B. McFarlane, Summit, N. J., assignors to Celanese Corporation of America, New York, N. Y., a corporation of Delaware No Drawing. Application October 2, 1950, Serial No. 188,067

17 Claims. (Cl. 260—77.5)

This invention relates to a polymerization process and relates more particularly to an improved polymerization process for the production of polyurethanes.

An important object of this invention is to provide an improved process for the production of polyurethanes by the polymerization of a bis-chloroformate and a diamine.

A further object of this invention is to provide an improved process for the production of polyurethanes by the polymerization of a bis-chloroformate and a diamine wherein the polymerization is carried out in a medium comprising a water-miscible organic solvent and a solution of the bis-chloroformate in a water-immiscible solvent dispersed in an aqueous solution of the diamine.

Other objects of this invention will be apparent from the following detailed description and claims.

Polyurethanes may be prepared by the polymerization of a bis-chloroformate and a diamine. According to one process that has been suggested for carrying out this polymerization, a solution of the bis-chloroformate in a water-immiscible solvent is dispersed in an aqueous solution of the diamine. The reaction between the bis-chloroformate and the diamine may be caused to take place by having present during the formation of the dispersion a sufficient quantity of an alkaline material, which may be the diamine itself, to react with the hydrochloric acid that is liberated as the reaction proceeds. Advantageously, however, as set forth in our applications Serial No. 117,712, filed September 24, 1949 and Serial No. 177,763, filed August 4, 1950, the dispersion is formed at a pH below about 7 or preferably below about 6, for example, by the use therein of a diamine acid salt such as the diamine hydrochloride, so that no reaction will take place initially between the bis-chloroformate and the diamine, and an alkaline material is added to the dispersion to raise the pH thereof to above about 8 or preferably to between about 10 and 12, to cause the polymerization to proceed.

We have now discovered that when a bis-chloroformate and a diamine are reacted to form a polyurethane in accordance with the processes outlined above, the polyurethane may be obtained in increased yields by having present in the dispersion during the polymerization a water-miscible organic solvent. Thus, in carrying out the process of this invention, a solution of a bis-chloroformate in a water-immiscible organic solvent is dispersed in an aqueous diamine solution in the presence of a water-miscible organic solvent, and the reaction between the bis-chloroformate and the diamine is caused to take place to produce the polyurethane.

Suitable water-miscible organic solvents that may be employed in carrying out the process of this invention include, for example, acetone, methyl ethyl ketone, dioxane, methanol, ethanol, isopropanol, ethylene glycol, diethylene glycol, glycerine, methyl cellosolve, ethyl cellosolve, diethyl ether of ethylene glycol, diacetone alcohol, diethylene glycol mono ethyl ether, acetonyl acetone, and diethylene glycol mono ethyl ether acetate. The water-miscible organic solvent may be employed in amounts ranging from about 10 to 100 parts by weight for each 100 parts by weight of water in the dispersion, but should not be present in amounts sufficient to produce a homogeneous solution rather than a dispersion when the bis-chloroformate solution is mixed with the diamine solution.

Suitable water-immiscible solvents for preparing the bis-chloroformate solution include, for example, aromatic solvents such as benzene, toluene, xylene, or the like, chloroform, carbon tetrachloride or other chlorinated aliphatic or aromatic hydrocarbons, octane, naphthene or petroleum fractions. Aromatic solvents are preferred for forming the bis-chloroformate solution as they yield polymers of more desirable molecular weight.

The aqueous diamine solution, into which the bis-chloroformate solution is dispersed, may contain only the diamine itself in those cases where the diamine functions as the alkaline material to cause the polymerization to proceed, or it may contain, in addition to the diamine, another alkaline material for this purpose. Advantageously, however, the aqueous diamine solution contains a sufficient quantity of acid, which may be added thereto in the form of the acid itself, or in the form of the diamine acid salt, to bring the pH thereof below the values specified above. As examples of suitable acids which may be employed for lowering the pH of the aqueous diamine solution or for forming the diamine acid salt there may be mentioned hydrochloric acid, sulphuric acid, phosphoric acid, acetic acid, formic acid, benzene sulfonic acid, alkyl benzene sulfonic acid, or mixtures thereof.

The bis-chloroformate solution is dispersed in the diamine solution in the presence of a water-miscible organic solvent by stirring, with or without the aid of a dispersing agent. Polymerization will begin immediately in those cases where the diamine solution contains an alkaline material. Where, however, the dispersion is acid, an alkaline material must be added thereto to cause the polymerization to proceed. Suitable alkaline materials are the soluble alkali metal or alkaline earth metal hydroxide, oxides or carbonates. The alkaline materials should be free from groups having a replaceable hydrogen atom attached thereto, which will react with the bis-chloroformate or the diamine and function as chain stoppers to limit the molecular weight of the polymer. Examples of suitable alkaline materials which may be employed are sodium hydroxide, potassium hydroxide, barium hydroxide, sodium carbonate, trisodium phosphate, and quaternary ammonium bases containing no replaceable hydrogen atom. The alkaline material employed should be one which will enable a pH of above about 8 to be obtained. In those cases, where the initial pH of the dispersion is below about 7, the addition of the alkaline material raises the pH of the dispersion, neutralizes the acid salt of the diamine, frees the diamine and enables it to react with the bis-chloroformate. The polyurethane polymer which is formed by the reaction of the bis-chloroformate and the diamine precipitates from the dispersion in the form of solid, finely-divided particles as the polymerization reaction proceeds. When the reaction is complete, the phases are allowed to separate and the precipitated polyurethane is filtered out. Reaction temperatures of from about − 20 to 30° C. may be employed. Most advantageously, the temperature during mixing, dispersion and polymerization is maintained at from about − 2 to 5° C. to achieve maximum molecular weight.

In forming the dispersion, there should preferably be employed from about 0.6 to 1.2 volumes of water-immiscible organic solvent for each volume of water and water-miscible solvent together in order to obtain polymers of optimum molecular weight. To obtain the maximum yield of polymer, the concentration of the diamine in the aqueous solution and the concentration of the bis-chloroformate in the water-immiscible solvent solution should be from about 0.1 to 1.0 mols per liter of solvent or even as high as about 5.0 mols per liter of solvent when proper agitation may be attained. More dilute solutions are undesirable economically as they produce a lower yield of the polymer and they necessitate the handling of a large bulk of solution for the production of a relatively small amount of product.

Numerous dispersing agents may be satisfactorily employed in our novel polymerization process to produce the desired dispersion of the water-immiscible solvent solution of the bis-chloroformate in the aqueous diamine solution. Dispersing agents of the anionic and non-ionic type are quite satisfactory although it is important that they do not contain amino groups having a replaceable hydrogen atom attached thereto, since such a group would be reactive in the condensation reaction and act as a chain stopper. Examples of suitable dispersing agents are long chain alcohol sulfates, such as sodium lauryl sulfate or sodium oleyl sulfate, ethylene oxide condensates with long chain fatty alcohols, esters of sodium sulfosuccinic acid, such as the dioctyl ester, long chain fatty acid esters of polyethylene glycol, ethylene oxide condensates with castor oil, long chain monoglycerides, alkyl aryl polyether alcohols, i. e. the reaction product of ethylene oxide and xylenol, sorbitan monolaurate, the condensation product of sorbitan monolaurate with ethylene oxide, mono- or poly-alkyl naphthalene sulfonates, sulfates of fatty acid monoglycerides or the glycol esters of long chain fatty acids. To produce polymers of good color it is important that the dispersing agent be as free as possible of colored bodies, as the polymer tends to scavenge colored bodies from the dispersing agent and the reaction mixture. The most advantageous results are obtained by employing dispersing agents comprising the sodium salt of an N-substituted amino-ethane-sulfonic acid, i. e. an N-substituted taurine. The substituents on the nitrogen may include both alkyl groups such as methyl, ethyl, propyl, butyl, amyl, hexyl, heptyl, octyl, decyl, undecyl, dodecyl, etc. and acidyl groups. The acidyl group, when present, is preferably the acidyl group of a long chain saturated or unsaturated aliphatic acid containing six to eighteen carbon atoms. Examples of said acids are lauric, oleic, ricinoleic, linoleic, caproic, pimelic, heptylic, undecyclic and stearic acid, for example. Optimum results are achieved employing the sodium salt of N-butyl, N-lauroyl β-amino-ethane sulfonic acid as the dispersing agent. The amount of dispersing agent employed is preferably from 0.02 to 0.04 mol for each mol of the diamine or bis-chloroformate undergoing reaction.

Examples of diamines which may be employed in forming polyurethanes in accordance with the novel polymerization process of our invention are ethylene diamine, trimethylene diamine, tetramethylene diamine, pentamethylene diamine, hexamethylene diamine, ortho-, meta- or para-phenylene diamine, cyclohexylene diamine and nuclearly substituted-phenylene diamines and nuclearly substituted - cyclohexylene diamines. N-substituted diamines which contain a free amino hydrogen on each amino group are also suitable.

Other diamines which may also be employed are, for example, $\alpha,\omega$-di-(3-aminopropoxy)-alkanes, such as 1,4-di-(3-aminopropoxy)-butane, bis-($\omega$-amino-alkyl)-ethers such as 3,3'-diamino-di-propyl-ether, 4,4'-diamino-dicyclohexyl methane, bis-($\omega$-amino-akyl)-sulfides such as 2,2'-diamino-di-ethyl-sulfide, 1,2-, 1,3-, or 1,4-$\alpha,\alpha'$-diamino xylene or other $\omega,\omega'$-diamino dialkyl benzene, diamino-naphthalene, diamino-biphenyl, $\omega,\omega'$-diamino dialkyl biphenyls, $\omega$-amino-alkyl anilines, $\omega$-amino-alkyl cyclohexyl-amines, bis($\omega$-amino-alkoxy)-benzene, bis-($\omega$-amino-alkoxy)-cyclohexane; 4,4'-diamino-di-cyclohexyl sulfones, $\omega,\omega'$ - sulfonyl - bis - alkyl amines, diamino diphenyl sulfones, diamino benzophenones and N,N'-bis-($\omega$-amino-alkyl)-$\alpha,\omega$-alkane disulfonamides. Amines containing more than two reactive amino groups, either primary or secondary, such as diethylene triamine or triethylene tetramine, for example, yield branch chain polyurethanes. Such polymers, if they contain moderately branched chains, are of relatively low melting point. If the chains are highly branched the polymers approach and may even reach substantial infusibility.

The bis-chloroformates which are reacted with the above mentioned diamines may be obtained by reacting phosgene, i. e. carbonyl chloride, with a diol. The bis-chloroformates of diols such as ethylene glycol, trimethylene glycol and 1,4-butanediol, for example, are suitable. Higher glycols wherein the alkylene chain contains a greater number of carbon atoms, straight chain or branched chain, are also satisfactory. Examples of other diols whose bis-chloroformates may be employed are ω,ω-dihydroxy-dialkyl ethers, ω,ω'-dihydroxy-dialkyl thioethers, bis-glycol or diglycol esters of straight chain or branched chain aliphatic dicarboxylic acids such as the bis-ethylene glycol ester of succinic acid, the bis-diethylene glycol ester of succinic acid, the bis-ethylene glycol ester of glutaric acid, the bis-ethylene glycol ester of adipic acid, the bis-ethylene glycol ester of pimelic acid, the bis-ethylene glycol ester of suberic acid, azelaic acid or sebacic acid, the diol, dimer or trimer esters obtained by the conversion of an excess of an aliphatic glycol with a dicarboxylic acid of the several aliphatic dicarboxylic acids mentioned above, ω,ω'-dihydroxy-dialkyl ethers of hydroquinone, ω,ω'-dihydroxy-dialkyl ethers of dihydroxy cyclohexane, ω,ω'-sulfonyl bis-alkanols, i. e. bis-(ω-hydroxyalkyl sulfones), N,N'-(ω-hydroxy-alkyl)-dicarboxyamides such as N,N'-(β,β'-dihydroxy-diethyl)-adipamide, cycloaliphatic glycols as cyclohexylene glycol, dihydroxy tetrahydrofurane, hydroxy-hydromethyl furane, hydroxy-hydroxymethyl tetrahydrofurane, and dihydroxy-oxathiane dioxide.

Thus, the polyurethane may contain an alkylene linkage of two, three, four, five or more carbon atoms alternating with the alkylene linkage of two, three, four, five or more carbon atoms. For ready identification, the alkylene polyurethanes may be identified as 2,4-, 3,4-, 4,4-, 5,6-, 6,6-, or other polyurethane, the first numeral referring to the carbon chain length of the diamine employed while the second refers to the carbon chain length of the bis-chloroformate. Mixed polyurethances containing any type of intermediate linkage or grouping as indicated above may also be formed by employing any of the diamines and bis-chloroformate of the diols mentioned or a mixture of two or more different diamines or two or more different bis-chloroformates.

In order further to illustrate our invention, but without being limited thereto, the following examples are given:

EXAMPLE I

A solution of 17.6 parts by weight of tetramethylene diamine in 500 parts by weight of water is neutralized to the Congo red end point (pH 3–5) by the addition of about 42 parts by weight of concentrated hydrochloric acid (sp. gr. —1.19). To this solution are added 450 parts by weight of water and 673 parts by weight of acetone and the solution is cooled to 0 to 2° C. A solution of 42.8 parts by weight of butanediol bis-chloroformate in 1082 parts by weight of toluene is added to the cooled diamine solution and the mixture is stirred vigorously to form a dispersion. While continuing the stirring and holding the temperature of the dispersion at 0 to 2° C., there is added to the dispersion over a period of 53 minutes, 250 parts by weight of 3.24 normal aqueous sodium hydroxide solution and stirring is continued for an additional 10 minutes. The pH of the solution rises rapidly to 8 and remains at this point until substantially all the sodium hydroxide is added when it rises further to 10. The dispersion is permitted to stand to allow the polymer to separate, the polyurethane is filtered off, purified by slurrying alternately with water and acetone and dried at 100–110° C. in vacuum for 18 hours. The 4,4-polyurethane is obtained in a yield of 73% of theory.

When the polymerization described above is carried out omitting the acetone and substituting an equal volume of water in its place, the 4,4-polyurethane is obtained in a yield of only 52% of theory.

EXAMPLE II

A solution of 17.6 parts by weight of tetramethylene diamine in 500 parts by weight of water is neutralized to the Congo red end point (ph 3–5) by the addition of about 42 parts by weight of concentrated hydrochloric acid (sp. gr. —1.19). To this solution are added 450 parts by weight of water and 673 parts by weight of acetone and 5 parts by weight of the sodium salt of N-lauroyl-N-butyl-taurine and the solution is cooled to —2 to 2° C. A solution of 42.8 parts by weight of butanediol bis-chloroformate in 1082 parts by weight of toluene is added to the cooled diamine solution and the mixture is stirred vigorously to form a dispersion. While continuing the stirring and holding the temperature of the dispersion at —2 to 2° C. there is added to the dispersion over a period of 60 minutes, 254 parts by weight of a 3.24 normal aqueous sodium hydroxide solution and stirring is continued for an additional 15 minutes. The solution rises to pH 8 during the addition of the sodium hydroxide. The dispersion is permitted to stand to allow the polymer to separate, the polyurethane is filtered off, purified by slurrying alternately with water and acetone and dried at 100–110° C. in vacuum for 18 hours. The 4,4-polyurethane is obtained in a yield of 89% of theory.

When polymerization described above is carried out omitting the acetone and substituting an equal volume of water in its place, the 4,4-polyurethane is obtained in a yield of only 81% of theory.

EXAMPLE III

A solution of 17.6 parts by weight of tetramethylene diamine in 500 parts by weight of water is neutralized to the Congo red end point (pH 3–5) by the addition of about 42 parts by weight of concentrated hydrochloric acid (sp. gr.—1.19). To this solution are added 975 parts by weight of water, 307 parts by weight of ethylene glycol and 10 parts by weight of the sodium salt of N-lauroyl-N-butyl taurine and the solution is cooled to —6 to —5° C. A solution of 42.8 parts by weight of butanediol bis-chloroformate in 1082 parts by weight of toluene is added to the cooled diamine solution and the mixture is stirred vigorously to form a dispersion. While continuing the stirring and holding the temperature of the dispersion at —6 to —5° C. there is added to the dispersion over a period of 60 minutes, 254 parts by weight of a 3.24 normal aqueous sodium hydroxide solution and stirring is continued for a period of 15 minutes. The solution rises to pH 10 during the addition of the sodium hydroxide. The dispersion is permitted to stand to allow the polymer to separate, the polyurethane is filtered off, purified by slurrying alternately with water and acetone and dried at 100–110° C. in vacuum for 18 hours. The 4,4-polyurethane is obtained in a yield of 85% of theory.

When the polymerization described above is carried out omitting the ethylene glycol and substituting an equal volume of water in its place, the 4,4-polyurethane is obtained in a yield of only 82% of theory.

EXAMPLE IV

A polymerization as described in Example III is carried out at a temperature of −5 to −4° C. substituting 347 parts by weight of glycerine in place of the ethylene glycol. The 4,4-polyurethane is obtained in a yield of 87% of theory.

It is to be understood that the foregoing detailed description is given merely by way of illustration and that many variations may be made therein without departing from the spirit of our invention.

Having described our invention, what we desire to secure by Letters Patent is:

1. In a process for the production of polyurethanes by the polymerization of a bis-chloroformate containing at least 2 carbon atoms between the chloroformate groups and a diamine containing at least 2 carbon atoms between the amino groups, the step of carrying out the polymerization in a medium comprising a water-miscible organic inert solvent having a boiling point not higher than 244.5° C. and a solution of the bis-chloroformate in a water-immiscible solvent dispersed in an aqueous solution of the diamine.

2. In a process for the production of polyurethanes by the polymerization of a bis-chloroformate containing at least 2 carbon atoms between the chloroformate groups and a diamine containing at least 2 carbon atoms between the amino groups, the step of carrying out the polymerization in a medium comprising a water-miscible organic inert solvent having a boiling point not higher than 244.5° C. and a solution of the bis-chloroformate in a water-immiscible solvent dispersed in an aqueous solution of the diamine with the aid of a dispersing agent.

3. In a process for the production of polyurethanes by the polymerization of a bis-chloroformate containing at least 2 carbon atoms between the chloroformate groups and a diamine containing at least 2 carbon atoms between the amino groups, the step of carrying out the polymerization in a medium comprising a water-miscible organic inert solvent having a boiling point not higher than 244.5° C. and a solution of the bis-chloroformate in a water immiscible solvent dispersed in an aqueous solution of the diamine, there being present in said medium from about 10 to 100 parts by weight of the water-miscible solvent for each 100 parts by weight of water.

4. In a process for the production of polyurethanes by the polymerization of a bis-chloroformate containing at least 2 carbon atoms between the chloroformate groups and a diamine containing at least 2 carbon atoms between the amino groups, the step of carrying out the polymerization in a medium comprising a water-miscible organic inert solvent having a boiling point not higher than 244.5° C. and a solution of the bis-chloroformate in a water-immiscible solvent dispersed in an aqueous solution of the diamine, there being present in said medium from about 0.6 to 1.2 volumes of water-immiscible solvent for each volume of water and water-miscible solvent together.

5. In a process for the production of polyurethanes by the polymerization of a bis-chloroformate containing at least 2 carbon atoms between the chloroformate groups and a diamine containing at least 2 carbon atoms between the amino groups, the step of carrying out the polymerization in a medium comprising a water-miscible organic inert solvent having a boiling point not higher than 244.5° C. and a solution of the bis-chloroformate in a water-immiscible solvent dispersed in an aqueous solution of the diamine, there being present in said medium from about 10 to 100 parts by weight of the water-miscible solvent for each 100 parts by weight of water, and from about 0.6 to 1.2 volumes of water-immiscible solvent for each volume of water and water-miscible solvent together.

6. In a process for the production of polyurethanes by the polymerization of a bis-chloroformate containing at least 2 carbon atoms between the chloroformate groups and a diamine containing at least 2 carbon atoms between the amino groups, the step of carrying out the polymerization at a temperature of about −20 to 30° C. in a medium comprising a water-miscible organic inert solvent having a boiling point not higher than 244.5° C. and a solution of the bis-chloroformate in a water-immiscible solvent dispersed in an aqueous solution of the diamine.

7. In a process for the production of polyurethanes by the polymerization of a bis-chloroformate containing at least 2 carbon atoms between the chloroformate groups and a diamine containing at least 2 carbon atoms between the amino groups, the step of carrying out the polymerization in a medium comprising a water-miscible organic inert solvent having a boiling point not higher than 244.5° C. and a solution of the bis-chloroformate in a water-immiscible solvent dispersed in an aqueous solution of the diamine, the concentration of bis-chloroformate in the water-immiscible solvent solution and the concentration of the diamine in the aqueous solution being from about 0.1 to 5.0 mols per liter of solvent.

8. In a process for the production of polyurethanes by the polymerization of a bis-chloroformate containing at least 2 carbon atoms between the chloroformate groups and a diamine containing at least 2 carbon atoms between the amino groups, the step of carrying out the polymerization at a temperature of −20 to 30° C. in a medium comprising a water-miscible organic inert solvent having a boiling point not higher than 244.5° C. and a solution of the bis-chloroformate in a water immiscible solvent dispersed in an aqueous solution of the diamine, the concentration of bis-chloroformate in the water-immiscible solvent solution and the concentration of the diamine in the aqueous solution being from about 0.1 to 5.0 mols per liter of solvent.

9. In a process for the production of polyurethanes by the polymerization of a bis-chloroformate containing at least 2 carbon atoms between the chloroformate groups and a diamine containing at least 2 carbon atoms between the amino groups, the steps which comprise forming in the presence of a water-miscible inert solvent having a boiling point not higher than 244.5° C., a dispersion of a solution of the bis-chloroformate in a water-immiscible solvent in an aqueous solution of the diamine at a pH below about 7, and adding an alkaline material to the dispersion to effect the polymerization of the bis-chloroformate and the diamine.

10. In a process for the production of polyurethanes by the polymerization of a bis-chloroformate containing at least 2 carbon atoms between the chloroformate groups and a diamine containing at least 2 carbon atoms between the amino groups, the steps which comprise forming in the presence of a water-miscible inert solvent having a boiling point not higher than 244.5° C., a dispersion of a solution of the bis-chloroformate in a water-immiscible solvent in an aqueous solution of the diamine at a pH below about 7, and adding an alkaline material to the dispersion to raise the pH of the dispersion to above about 8 to effect the polymerization of the bis-chloroformate and the diamine.

11. In a process for the production of polyurethanes by the polymerization of a bis-chloroformate containing at least 2 carbon atoms between the chloroformate groups and a diamine containing at least 2 carbon atoms between the amino groups, the steps which comprise forming in the presence of a water-miscible inert solvent having a boiling point not higher than 244.5° C., a dispersion of a solution of the bis-chloroformate in a water-immiscible solvent in an aqueous solution of the diamine at a pH below about 7, and adding an alkaline material to the dispersion to raise the pH of the dispersion to between about 10 and 12 to effect the polymerization of the bis-chloroformate and the diamine.

12. In a process for the production of polyurethanes by the polymerization of a bis-chloroformate containing at least 2 carbon atoms between the chloroformate groups and a diamine containing at least 2 carbon atoms between the amino groups, the steps which comprises forming in the presence of a water-miscible inert solvent having a boiling point not higher than 244.5° C., a dispersion of a solution of the bis-chloroformate in a water-immiscible solvent in an aqueous solution of the diamine at a pH below about 7, and adding an alkaline material to the dispersion to effect the polymerization of the bis-chloroformate and the diamine, there being present in said medium from about 10 to 100 parts by weight of the water-miscible solvent for each 100 parts by weight of water.

13. In a process for the production of polyurethanes by the polymerization of a bis-chloroformate containing at least 2 carbon atoms between the chloroformate groups and a diamine containing at least 2 carbon atoms between the amino groups, the steps which comprises forming in the presence of a water-miscible inert solvent having a boiling point not higher than 244.5° C., a dispersion of a solution of the bis-chloroformate in a water-immiscible solvent in an aqueous solution of the diamine at a pH below about 7, and adding an alkaline material to the dispersion at a temperature of about −20 to 30° C. to raise the pH of the dispersion to between about 10 and 12 to effect the polymerization of the bis-chloroformate and the diamine.

14. In a process for the production of polyurethanes by the polymerization of a bis-chloroformate containing at least 2 carbon atoms between the chloroformate groups and a diamine containing at least 2 carbon atoms between the amino groups, the steps which comprise forming in the presence of a water-miscible inert solvent having a boiling point not higher than 244.5° C., a dispersion of a solution of the bis-chloroformate in a water-immiscible solvent in an aqueous solution of the diamine acid salt, and adding an alkaline material to the dispersion to effect the polymerization of the bis-chloroformate and the diamine.

15. In a process for the production of 4,4-polyurethane by the polymerization of butanediol bis-chloroformate and tetramethylene diamine, the steps of carrying out the polymerization in a medium comprising a water-miscible organic inert solvent having a boiling point not higher than 244.5° C. and a solution of the butanediol bis-chloroformate in a water-immiscible solvent dispersed in an aqueous solution of the tetramethylene diamine.

16. In a process for the production of 4,4-polyurethane by the polymerization of butanediol bis-chloroformate and tetramethylene diamine, the steps which comprise forming, in the presence of a water-miscible inert solvent having a boiling point not higher than 244.5° C., a dispersion of a solution of the butanediol bis-chloroformate in a water-immiscible solvent in an aqueous solution of the tetramethylene diamine at a pH below about 7, and adding an alkaline material to the dispersion to effect the polymerization of the butanediol bis-chloroformate and the tetramethylene diamine.

17. In a process for the production of 4,4-polyurethane by the polymerization of butanediol bis-chloroformate and tetramethylene diamine, the steps which comprise forming, in the presence of acetone, a dispersion of a solution of the butanediol bis-chloroformate in toluene in an aqueous solution of the tetramethylene diamine at a pH below about 6, and adding an alkaline material to the dispersion at a temperature of about −20 to 30° C. to raise the pH of the dispersion to between about 10 and 12 to effect the polymerization of the butanediol bis-chloroformate and the tetramethylene diamine, there being present in said dispersion from about 10 to 100 parts by weight of acetone for each 100 parts by weight of water, and from about 0.6 to 1.2 volumes of toluene for each volume of water and acetone together, and the concentration of the butanediol bis-chloroformate in the toluene and the concentration of the tetramethylene diamine in the aqueous solution being from about 0.1 to 1.0 mol per liter of solvent.

WILFORD DONALD JONES.
SAMUEL B. McFARLANE.

References Cited in the file of this patent

UNITED STATES PATENTS

| Number | Name | Date |
|---|---|---|
| 1,970,578 | Schoeller | Aug. 21, 1934 |

FOREIGN PATENTS

| Number | Country | Date |
|---|---|---|
| 53,325 | France | Jan. 22, 1945 |
| | (1st addition to 892,361) | |
| 892,361 | France | Apr. 5, 1944 |